United States Patent
Schurmans et al.

(10) Patent No.: US 6,802,404 B1
(45) Date of Patent: Oct. 12, 2004

(54) ELECTRO-RHEOLOGICAL OR MAGNETO-RHEOLOGICAL CONTROLLED HYDRAULIC RESTRICTION

(75) Inventors: Rudi Schurmans, Nieuwerkerken (BE); Mario Maes, Wolvegracnt (BE); David Holiviers, Linter (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/670,667

(22) Filed: Sep. 25, 2003

(51) Int. Cl.[7] .................................................. F16F 9/53
(52) U.S. Cl. ............... 188/267.1; 188/267; 188/322.15; 210/223
(58) Field of Search .............................. 188/267, 267.1, 188/267.2, 322.15, 322.22; 210/223, 266, 323, 695; 422/186.21; 95/58

(56) References Cited

U.S. PATENT DOCUMENTS

| | | | |
|---|---|---|---|
| 4,255,166 A | * | 3/1981 | Gernand et al. ............... 95/27 |
| 4,351,515 A | * | 9/1982 | Yoshida ...................... 267/225 |
| 5,014,829 A | | 5/1991 | Hare, Sr. |
| 5,161,653 A | | 11/1992 | Hare, Sr. |
| 5,277,281 A | | 1/1994 | Carlson et al. |
| 5,518,613 A | * | 5/1996 | Koczur et al. ............... 210/266 |
| 5,829,319 A | | 11/1998 | Mokeddem |
| 5,891,356 A | | 4/1999 | Inoue et al. |
| 5,894,000 A | | 4/1999 | Loy |
| 5,956,951 A | | 9/1999 | O'Callagham |
| 5,985,168 A | | 11/1999 | Phule |
| 6,065,572 A | * | 5/2000 | Schober et al. ............. 188/267 |
| 6,436,170 B1 | * | 8/2002 | McDermott et al. ........... 95/58 |
| 6,508,991 B2 | * | 1/2003 | Keppel .................. 422/186.21 |

* cited by examiner

Primary Examiner—Christopher P. Schwartz
(74) Attorney, Agent, or Firm—Harness, Dickey & Pierce, PLC

(57) ABSTRACT

A hydraulic fluid flow passage has a controlled restriction disposed within the passage. The restriction includes a first filter, a second filter and a plurality of particles disposed between the two filters. The particles are either dielectric particles or they are magnetizable particles. The dielectric particles create an electro-rheological fluid between the filters and the magnetizable particles create a magneto-rheological fluid between the filters. The arrangement for the dielectric particles is controlled by an electric field and the arrangement for the magnetizable particles is controlled by a magnetic field.

22 Claims, 4 Drawing Sheets

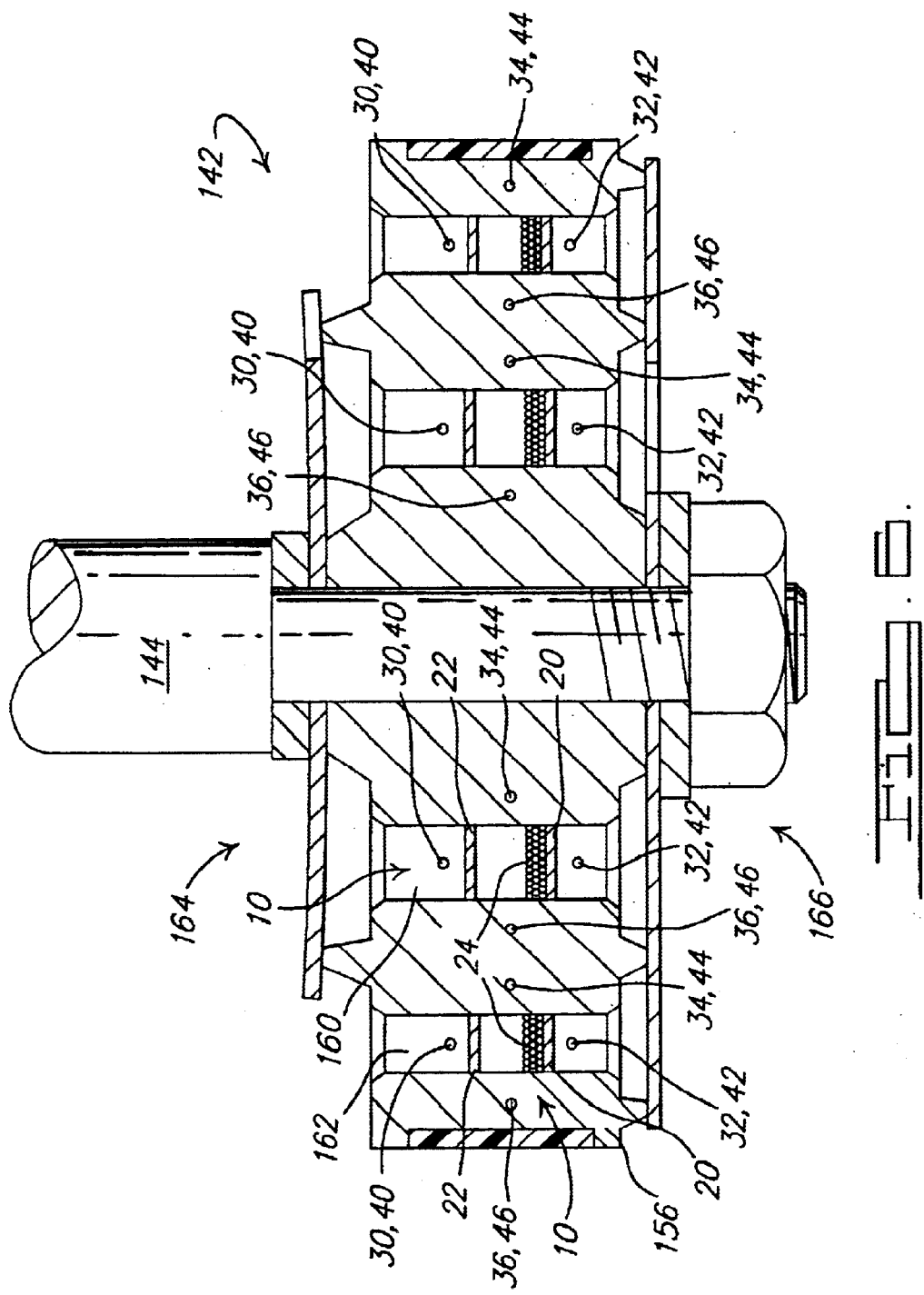

ELECTRO-RHEOLOGICAL OR MAGNETO-RHEOLOGICAL CONTROLLED HYDRAULIC RESTRICTION

FIELD OF THE INVENTION

The present invention relates to the control of hydraulic fluid flow through a restriction. More specifically, the present invention relates to the control of hydraulic fluid flow through a restriction using an electro-rheological fluid or a magneto-rheological fluid.

BACKGROUND OF THE INVENTION

Numerous applications in the prior art require that hydraulic fluid flow through a restriction be controlled. The simplest type of control is to use a specific size of a restriction and/or a hydraulic fluid having a specific viscosity. More sophisticated methods involve the control for the size of the restriction in relation to some specified parameter. At one end of the spectrum of the specified parameter, the restriction will be at its smallest size and at the opposite end of the spectrum of the specified parameter, the restriction will be at its greatest size.

One application which utilizes a variable restriction is in a shock absorber or damper positioned within a vehicle suspension system. In general, the vehicle suspension system is provided to filter or isolate the vehicle body from irregularities in a road surface as well as to control body and wheel motion. The conventional non-intelligent suspension system includes a spring and a damping device such as a shock absorber in parallel to accomplish this purpose. The spring and damping device are positioned in parallel between the sprung mass and the unsprung mass of the vehicle.

The damping devices, such as shock absorbers and/or struts, are used in conjunction with conventional non-intelligent or passive suspension systems to absorb unwanted vibrations which occur during driving. To absorb these unwanted vibrations, the conventional damping devices or hydraulic actuators often include a piston which is located within a pressure tube and which is connected to the body of the vehicle through a piston rod. The pressure tube is connected to the vehicle's suspension system. Because the piston is able to limit the flow of damping fluid within the working chamber of the pressure tube when the damper is telescopically displaced, the damper is able to produce a damping force which counteracts the vibration which would be otherwise transmitted directly from the vehicle's suspension system to the vehicle's body. The greater the degree to which the flow of damping fluid within the working chamber is restricted by the piston, the greater the damping forces which are generated by the damper. Thus, a small size for the restriction will generate a high damping force and a large size for the restriction will generate a low damping force.

Various types of adjustment mechanisms have been developed to generate variable damping forces in relation to the speed of the vehicle, the amplitude of the displacement of the damper, the acceleration of the damper, the weight of the vehicle as well as other operating characteristics of the vehicle. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass and thus, the need for a soft ride or low damping characteristic of the suspension system to isolate the sprung mass from these small vibrations. During a turning or braking maneuver, as an example, the sprung mass of the vehicle will attempt to undergo a relatively slow and/or large movement or vibration which then requires a firm ride or a high damping characteristic of the suspension system to support the sprung mass and provide stable handling characteristics to the vehicle. The adjustable mechanisms for the damping rates of the shock absorber typically function by controlling the amount of fluid flow between the various chambers of the shock absorber. The adjustable mechanisms offer the advantage of a smooth steady state ride by isolating the high frequency/small amplitude excitations of the unsprung mass while still providing the necessary damping or firm ride for the suspension system during vehicle maneuvers causing low frequency/large excitations of the sprung mass.

The continued development of shock absorbers includes the development of adjustment systems which provide the vehicle designer with a continuously variable system which can be specifically tailored to a vehicle to provide a specified amount of damping in relation to various monitored conditions of the vehicle and its suspension system.

SUMMARY OF THE INVENTION

The present invention provides the art with a controlled restriction for a hydraulic fluid flow passage. For exemplary purposes only, the controlled restriction is illustrated in conjunction with a shock absorber for a vehicle. The control of the size of the restriction and the amount of fluid flow through the passage is through the use of an electro-rheological fluid or a magneto-rheological fluid restriction which is disposed within the fluid passage. The amount of fluid flow through the restriction is controlled by applying an electric or magnetic field in a specified direction. The application of the electric or magnetic field and its direction in relation to the fluid flow will determine the amount of restriction and thus the amount of fluid flow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is an enlarged view of the piston assembly of the shock absorber shown in FIGS. 4 and 5.

DETAILED DESCRIPTION OF THE PREFERRED EMBODIMENTS

The following description of the preferred embodiment(s) is merely exemplary in nature and is in no way intended to limit the invention, its application, or uses.

Figure 1:
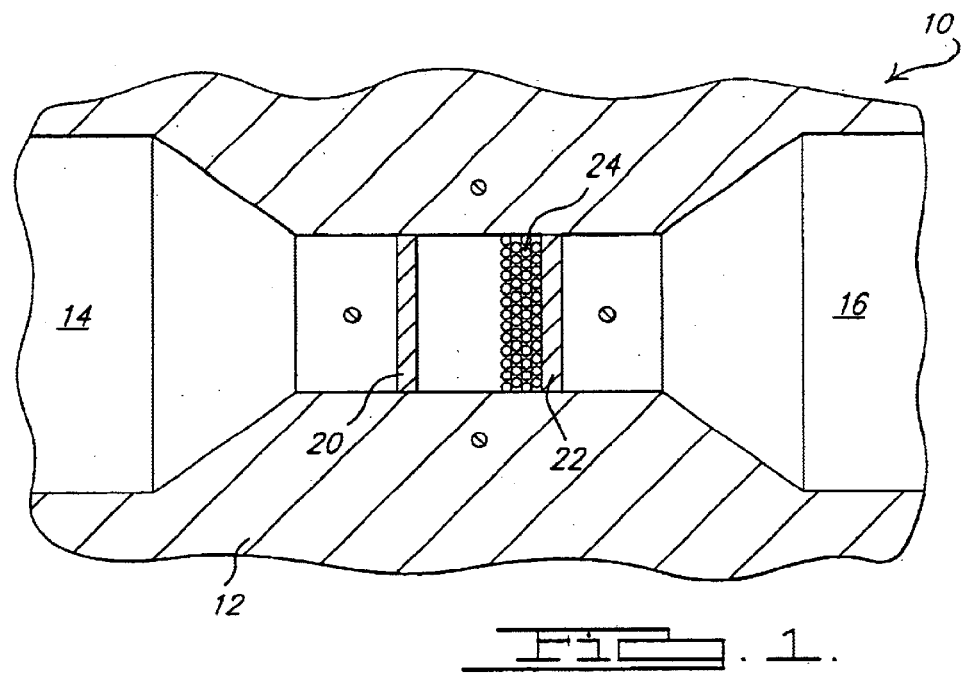
FIG. 1 is a schematic representation of the rheological restriction in accordance with the present invention without a field being applied to the restriction.
Figure 2:
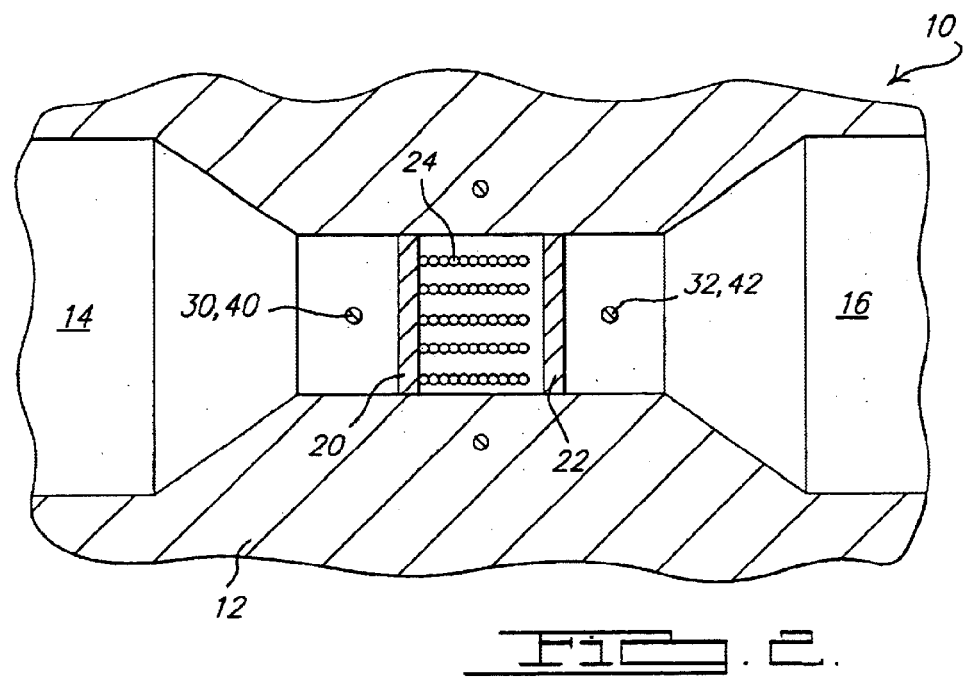
FIG. 2 is a schematic representation of the rheological restriction shown in FIG. 1 with the field applied in the direction of fluid flow.
Figure 3:
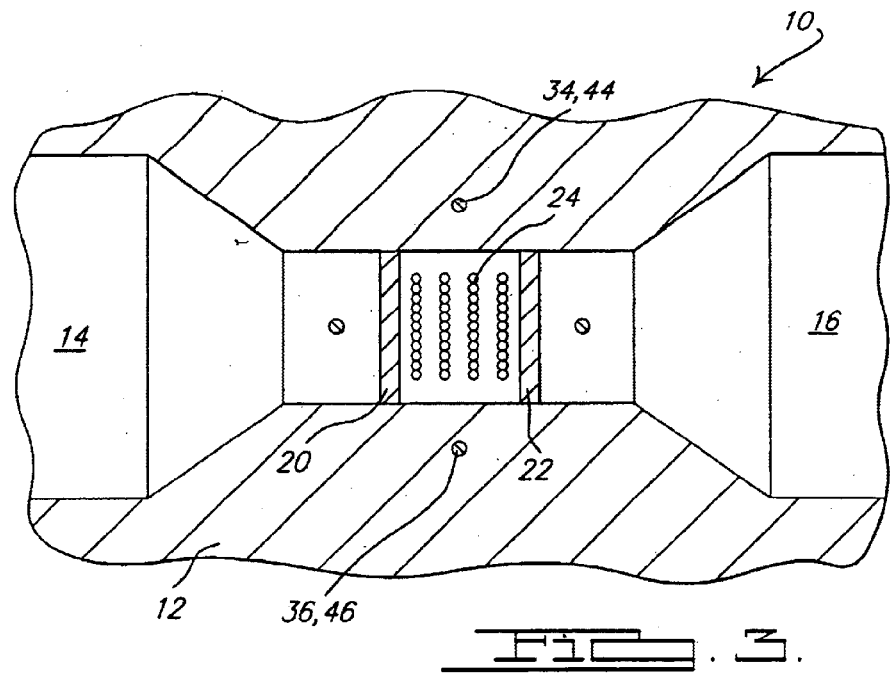
FIG. 3 is a schematic representation of the rheological restriction shown in FIG. 1 with the field applied in a direction perpendicular to the fluid flow.

Referring now to the drawings in which like reference numerals designate like or corresponding parts throughout the several views, there is shown in FIGS. 1–3 a controlled hydraulic restriction in accordance with the present invention and which is designated generally by reference numeral 10. Hydraulic restriction 10 is formed by a housing 12 which defines a first chamber 14 and a second chamber 16. Hydraulic restriction 10 is disposed between first chamber 14 and second chamber 16 to control the flow of fluid between the two chambers.

Disposed within hydraulic restriction 10 are a first filter 20, a second filter 22 and a plurality of particles 24. Filters 20 and 22 have a filtration grade below the size of particles 24 but they do allow the flow of fluid between chambers 14 and 16. Thus, the fluid within first chamber 14 is free of particles 24, the fluid within hydraulic restriction 10 includes the plurality of particles 24, and the fluid within chamber 16 is free of particles 24.

Particles 24 are either dielectric particles which create an electro-rheological fluid between filters 20 and 22 or particles 24 are micron-sized magnetizable particles which create a magneto-rheological fluid between filters 20 and 22.

Electro-rheological fluids are dispersions of dielectric particles in an electrically insulating oil. The dielectric particles are so-called dispersed phase and the insulating oil is so-called a dispersion medium. When there is no electric field applied, the electro-rheological dispersion will behave as shown in FIG. 1. Particles 24 will be located adjacent one of the two filters 20 and 22 depending on the direction of fluid flow. With particles 24 located adjacent to one of the two filters 20 and 22, the fluid flow through restriction 10 will be highly limited. When an electric field is applied in the direction of fluid flow, the dispersed particles are electrically polarized. The polarized particles attract each other due to the electrostatic interaction. Consequently, particle cluster chains form between the electrodes 30 and 32 as shown in FIG. 2. With particles 24 clustered as shown in FIG. 2, fluid flow through hydraulic restriction 10 will be less restrictive. When an electric field is applied in the direction perpendicular to the fluid flow, the dispersed particles are again electrically polarized. The polarized particles attract each other due to the electrostatic interaction. Consequently, particle cluster chains form between the electrodes 34 and 36 as shown in FIG. 3. With particles 24 clustered as shown in FIG. 3, fluid flow through hydraulic restriction 10 will be less restrictive than the arrangement shown in FIG. 1 but it will be more restrictive than the arrangement shown in FIG. 2. Thus, by controlling the electric field, particles 24 can be clustered to provide a high restriction to fluid flow (FIG. 1), a low restriction to fluid flow (FIG. 2) and an intermediate restriction to fluid flow (FIG. 3).

Magneto-rheological fluids are suspensions of micron-sized, magnetizable particles in an oil. When there is no magnetic field applied, the magneto-rheological suspension will behave as shown in FIG. 1. Particles 24 will be located adjacent one of the two filters 20 and 22 depending on the direction of fluid flow. With particles 24 located adjacent to one of the two filters 20 and 22, the fluid flow through hydraulic restriction 10 will be highly limited. When a magnetic field is applied in the direction of fluid flow, the suspended particles are magnetically polarized. The polarized particles attract each other due to the magnetic interaction. Consequently, particle cluster chains form between the magnetic poles 40 and 42 as shown in FIG. 2. With particles 24 clustered as shown in FIG. 2, fluid flow through hydraulic restriction 10 will be less restrictive. When a magnetic field is applied in the direction perpendicular to the fluid flow, the suspended particles are again magnetically polarized. The polarized particles attract each other due to the magnetic interaction. Consequently, particle cluster chains form between the magnetic poles 44 and 46 as shown in FIG. 3. With particles 24 clustered as shown in FIG. 3, fluid flow through hydraulic restriction 10 will be less restrictive than the arrangement shown in FIG. 1 but it will be more restrictive than the arrangement shown in FIG. 2. Thus, by controlling the magnetic field, particles 24 can be clustered to provide a high restriction to fluid flow (FIG. 1), a low restriction to fluid flow (FIG. 2) and an intermediate restriction to fluid flow (FIG. 3).

Figure 4:
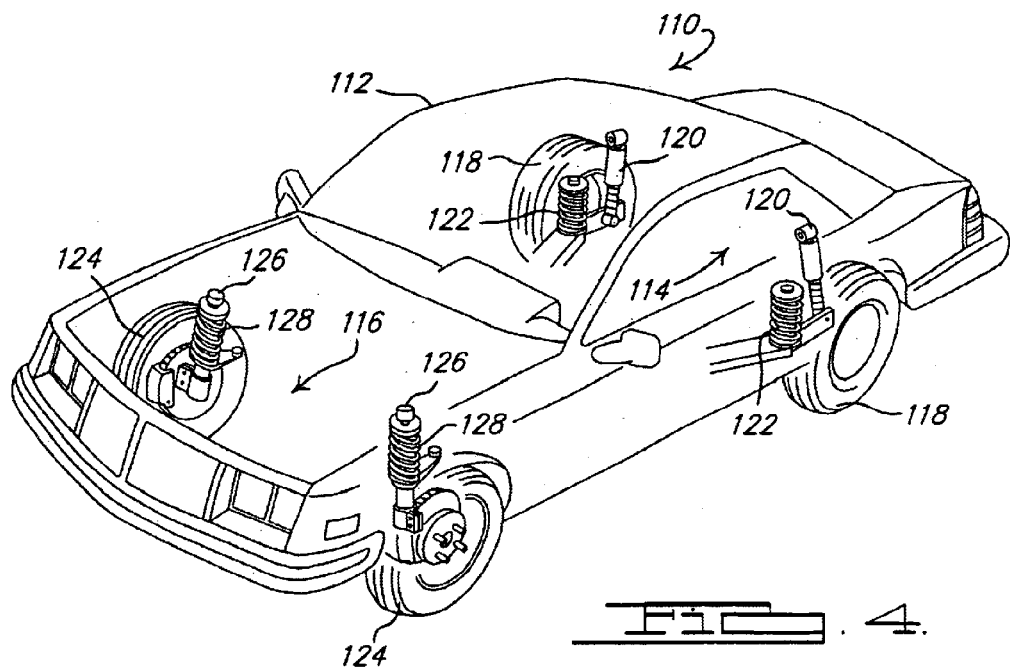
FIG. 4 is a schematic perspective of an automobile incorporating shock absorbers including the rheological restriction in accordance with the present invention.

Referring now to FIG. 4, there is shown a schematic representation of a vehicle 110 incorporating the rheological controlled hydraulic restriction in accordance with the present invention. While the present invention is illustrated in the drawings as being associated with an automotive vehicle, it is within the scope of the present invention to incorporate the rheological controlled hydraulic restriction of the present invention in other types of vehicles. In addition, the term "shock absorber" as used herein refers to shock absorbers in the general sense of the phrase and thus, it includes MacPherson struts as well as other damping devices.

Vehicle 110 includes a body 112, a rear suspension assembly 114 and a front suspension system 116. Rear suspension assembly 114 is a transversely extending rear suspension assembly adapted to operatively support a pair of rear wheels 118. Rear suspension assembly 114 is operatively connected to body 112 by means of a pair of shock absorbers 120 as well as a pair of springs 122. Front suspension system 116 includes a transversely extending rear suspension assembly adapted to operatively support a pair of front wheels 124. Front suspension system 116 is operatively connected to body 112 by means of a pair of shock absorbers 126, as well as by another pair of springs 128. Shock absorbers 120 and 126 serve to dampen the relative motion of the unsprung portion (front suspensions assembly 116 and rear suspension assembly 114) and the sprung portion (body 112) of vehicle 110.

Figure 5:
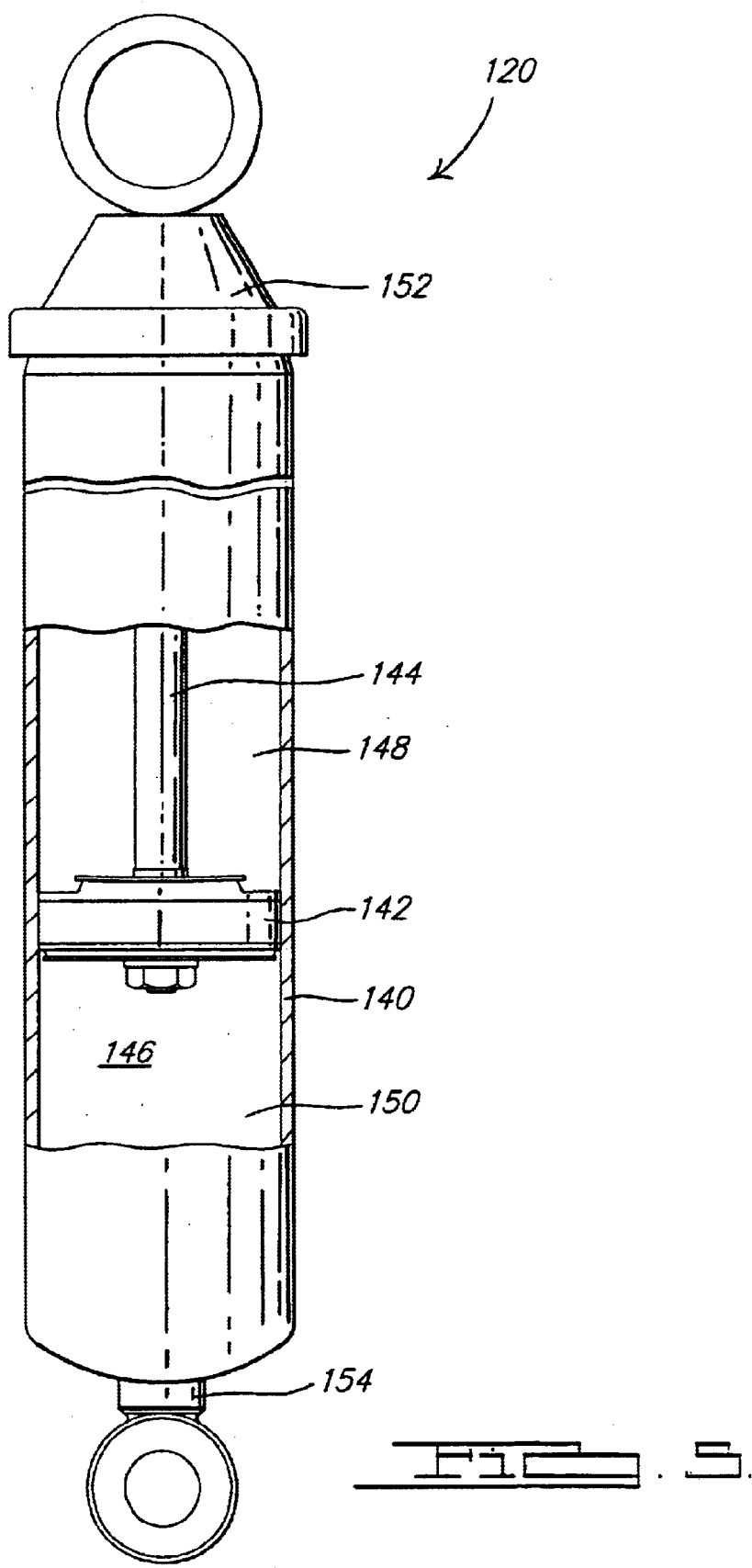
FIG. 5 is a cross-sectional side view of one of the shock absorbers shown in FIG. 4 incorporating the rheological restriction in accordance with the present invention.

Referring now to FIGS. 5 and 6, shock absorber 120 is shown in greater detail. While FIG. 5 illustrates shock absorber 120, it is to be understood that shock absorber 126 also includes the rheological controlled hydraulic restriction in accordance with the present invention. Shock absorber 126 differs than shock absorber 120 in the way in which it is adapted for assembly into vehicle 110. Shock absorber 120 comprises a pressure tube 140, a piston assembly 142 and a piston rod 144.

Pressure tube 140 defines a working chamber 146. Piston assembly 142 is slidably disposed within pressure tube 140 and it divides pressure tube 140 into an upper working chamber 148 and a lower working chamber 150. A seal is typically disposed between piston assembly 142 and pressure tube 140 to permit sliding movement of piston assembly 142 without generating undue frictional forces as well as sealing upper working chamber 148 from lower working chamber 150. Piston rod 144 is attached to piston assembly 142 and it extends through upper working chamber 148 and through an upper end cap 152 which closes the upper end of pressure tube 140. A sealing system associated with upper end cap 152 seals the interface between upper end cap 152 and piston rod 144. The end of piston rod 144 opposite to piston assembly 142 is adapted to be secured to the sprung portion of vehicle 110. Pressure tube 140 is filled with hydraulic oil and it includes an end cap 154 for attachment to the unsprung portion of vehicle 110. The hydraulic oil disposed within pressure tube 140 is compatible with particles 24 whether particles 24 create an electro-rheological fluid or if particles 24 create a magneto-rheological fluid.

Suspension movement of vehicle 110 will cause extension or compression movements of piston assembly 142 with respect to pressure tube 140. As piston assembly 142 slides with respect to pressure tube 140, hydraulic oil must flow between upper and lower working chambers 148 and 150. Shock absorber 120 generates damping forces by controlling the amount of fluid flow between chambers 148 and 150.

Piston assembly 142 includes a piston body 156 which defines at least one compression fluid passage 160 and at least one extension fluid passage 162. A compression valve assembly 164 permits fluid flow through passage 160 during a compression stroke of shock absorber 120 and prohibits fluid flow through passage 160 during an extension stroke of shock absorber 120. An extension valve assembly 166 permits fluid flow through passage 162 during an extension stroke of shock absorber 120 and prohibits fluid flow through passage 162 during a compression stroke of shock absorber 120.

Passages 160 and 162 each incorporate a respective rheological controlled hydraulic restriction 10. Piston body 156 serves as housing 12, upper working chamber 148 serves as first chamber 14 and lower working chamber 150 serves as second chamber 16 for hydraulic restriction 10. First filter 20, second filter 22 and particles 24 are disposed within each of passages 160 and 162. Electrodes 30–36 are incorporated into shock absorber 120 if particles 24 are electro-rheological controlled particles or magnetic poles 40–46 are incorporated into shock absorber 120 if particles 24 are magneto-rheological controlled particles.

During a compression stroke, hydraulic fluid must flow from lower working chamber 150 to upper chamber 148. Extension valve assembly 166 prohibits fluid flow through extension fluid passage 162 and thus, all fluid flow between chambers 148 and 150 will be through compression fluid passage 160. The rate of fluid flow through passage 160 will be determined by rheological controlled hydraulic restriction 10 disposed within passage 160. If no electric or magnetic field is applied, a highly restricted fluid flow will be created by hydraulic restriction 10 and thus, a firm ride or high damping load will be provided by shock absorber 120 (FIG. 1). If an electric or magnetic field is applied by electrodes 30 and 32 or magnetic poles 40 and 42, a low restricted fluid flow will be created by hydraulic restriction 10 and thus, a soft ride or low damping load will be provided by shock absorber 120 (FIG. 2). If an electric or magnetic field is applied by electrodes 34 and 36 or magnetic poles 44 and 46, an intermediate restricted fluid flow will be created by hydraulic restriction 10 and thus, an intermediate rid or an intermediate damping load will be provided by shock absorber 120 (FIG. 2).

During an extension stroke, hydraulic fluid must flow from upper working chamber 148 to lower chamber 150. Compression valve assembly 164 prohibits fluid flow through compression fluid passage 160 and thus, all fluid flow between chambers 148 and 150 will be through extension fluid passage 162. The rate of fluid flow through passage 162 will be determined by rheological controlled hydraulic restriction 10 disposed within passage 162. If no electric or magnetic field is applied, a highly restricted fluid flow will be created by hydraulic restriction 10 and thus, a firm ride or high damping load will be provided by shock absorber 120 (FIG. 1). If an electric or magnetic field is applied by electrodes 30 and 32 or magnetic poles 40 and 42, a low restricted fluid flow will be created by hydraulic restriction 10 and thus, a soft ride or low damping load will be provided by shock absorber 120 (FIG. 2). If an electric or magnetic field is applied by electrodes 34 and 36 or magnetic poles 44 and 46, an intermediate restricted fluid flow will be created by hydraulic restriction 10 and thus, an intermediate rid or an intermediate damping load will be provided by shock absorber 120 (FIG. 2).

Thus, by controlling the electric or magnetic field relating to passages 160 and 162, either together or separately, the damping characteristics for shock absorber 120 can be controlled to be firm, soft or intermediate in both the compression and extension movements for shock absorber 120.

While the above detailed description utilized a mono-tube design for the shock absorber, it is within the scope of the present invention to incorporate hydraulic restrictions 10 into dual tube shock absorbers, bypass flow shock absorbers (both internal and external to the tubes of the shock absorber) as well as other designs for dampers that are known in the art. Also, while the present invention is described as being incorporated into a shock absorber, the present invention is not limited to shock absorber applications, but it can be utilized with applications that include a controllable restriction including, but not limited to, all the difference versions of servo valve technology.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber having controllable restriction comprising:
    a first chamber;
    a second chamber;
    a flow passage disposed between said first and second chambers;
    a first filter disposed within said passage;
    a second filter disposed within said passage; and
    a plurality of particles disposed between said first and second filters, said plurality of particles being selectively arranged to control the rate of fluid flow through said passage.

2. A shock absorber having the controllable restriction as described in claim 1 wherein said plurality of particles are dielectric particles.

3. A shock absorber having the controllable restriction as described in claim 2 wherein said plurality of particles are arranged by an electric field.

4. A shock absorber having the controllable restriction as described in claim 1 wherein said plurality of particles are magnetizable particles.

5. A shock absorber having the controllable restriction as described in claim 4 wherein said plurality of particles are arranged by a magnetic field.

6. A shock absorber having the controllable restriction as described in claim 1 wherein said plurality of particles are selectively arranged into a first arrangement which provides a first flow rate and a second arrangement which provides a second flow rate, said second flow rate being greater than said first flow rate.

7. A shock absorber having the controllable restriction as described in claim 6 wherein said plurality of particles are selectively arranged into a third arrangement which provides a third flow rate, said third flow rate being between said first and second flow rates.

8. A shock absorber comprising:

a pressure tube defining a working chamber;

a piston slidably disposed within said working chamber, said piston dividing said working chamber into an upper working chamber and a lower working chamber;

a first flow passage disposed between said upper and lower working chambers, said first flow passage allowing fluid flow between said upper and lower working chambers;

a first controllable restriction disposed within said first flow passage, said first controllable restriction including a first filter disposed within said first flow passage, a second filter disposed within said first flow passage and a first plurality of particles disposed between said first and second filters, said first plurality of particles being selectively arranged to control the rate of fluid flow through said first flow passage.

9. The shock absorber as described in claim 8 wherein said first plurality of particles are dielectric particles.

10. The shock absorber as described in claim 9 wherein said first plurality of particles are arranged by an electric field.

11. The shock absorber as described in claim 8 wherein said first plurality of particles are magnetizable particles.

12. The shock absorber as described in claim 11 wherein said first plurality of particles are arranged by a magnetic field.

13. The shock absorber as described in claim 8 wherein said first plurality of particles are selectively arranged into a first arrangement which provides a first flow rate and a second arrangement which provides a second flow rate, said second flow rate being greater than said first flow rate.

14. The shock absorber as described in claim 13 wherein said first plurality of particles are selectively arranged into a third arrangement which provides a third flow rate, said third flow rate being between said first and second flow rates.

15. The shock absorber as described in claim 8 further comprising a valve attached to said piston, said valve permitting fluid flow through said first flow passage in a first direction and restricting fluid flow through said piston in a second direction.

16. The shock absorber as described in claim 8 further comprising:

a second flow passage disposed between said upper and lower working chambers, said second flow passage allowing fluid flow between said upper and lower working chambers; and a second controllable restriction disposed within said second flow passage, said second controllable restriction including a third filter disposed within said second flow passage, a fourth filter disposed within said second flow passage and a second plurality of particles disposed between said third and fourth filters, said second plurality of particles being selectively arranged to control the rate of fluid flow through said second flow passages.

17. The shock absorber as described in claim 16 wherein said first and second plurality of particles are dielectric particles.

18. The shock absorber as described in claim 17 wherein said first and second plurality of particles are arranged by an electric field.

19. The shock absorber as described in claim 16 wherein said first and second plurality of particles are magnetizable particles.

20. The shock absorber as described in claim 19 wherein said first and second plurality of particles are arranged by a magnetic field.

21. The shock absorber as described in claim 16 wherein said first and second plurality of particles are selectively arranged into a first arrangement which provides a first flow rate and a second arrangement which provides a second flow rate, said second flow rate being greater than said first flow rate.

22. The shock absorber as described in claim 21 wherein said first and second plurality of particles are selectively arranged into a third arrangement which provides a third flow rate, said third flow rate being between said first and second flow rates.

* * * * *